Feb. 23, 1937. H. O. C. INGRAHAM 2,071,534
APPARATUS FOR PRODUCING SULPHUR DIOXIDE
Filed Aug. 18, 1932 2 Sheets-Sheet 1
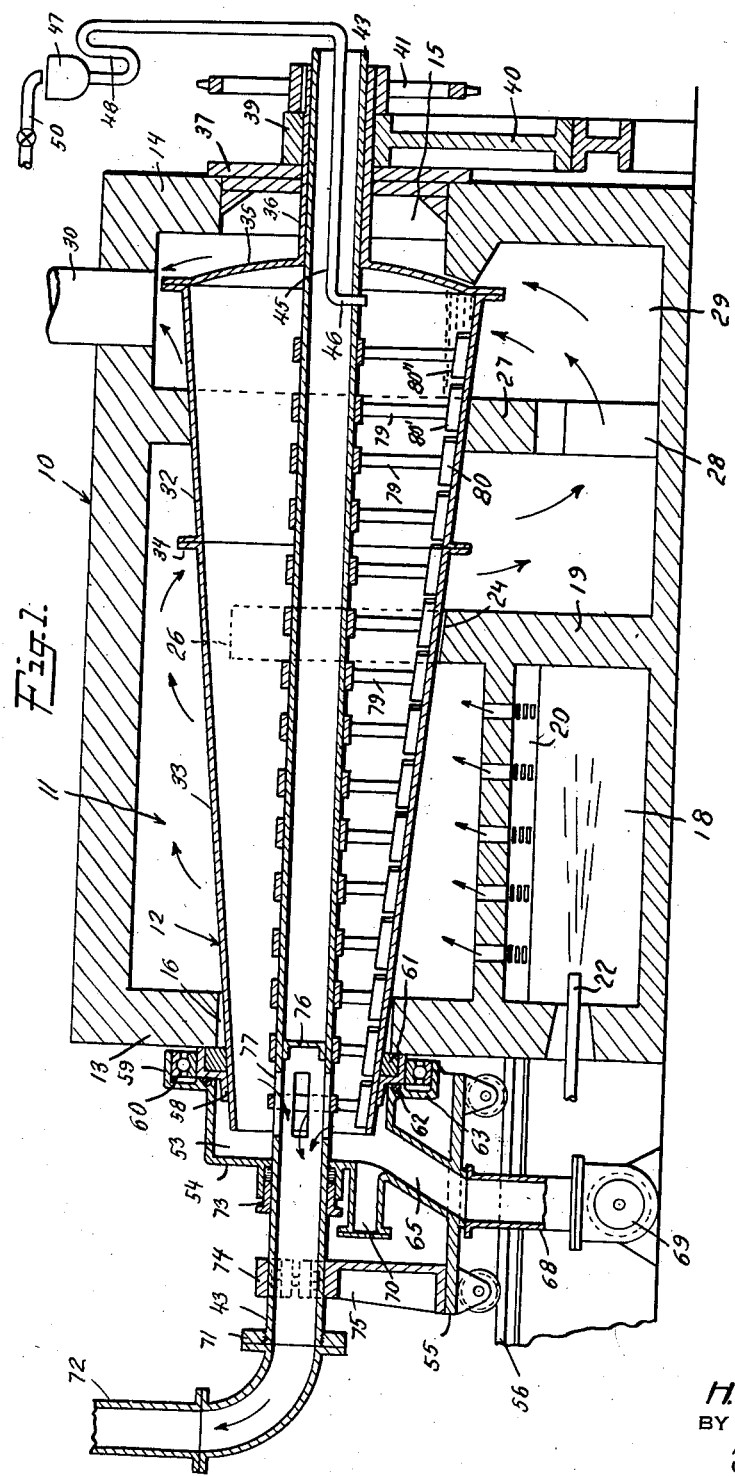
INVENTOR
H.O.C. Ingraham
BY
J. Ross Tuttle
ATTORNEY Feb. 23, 1937. H. O. C. INGRAHAM 2,071,534
APPARATUS FOR PRODUCING SULPHUR DIOXIDE
Filed Aug. 18, 1932 2 Sheets-Sheet 2
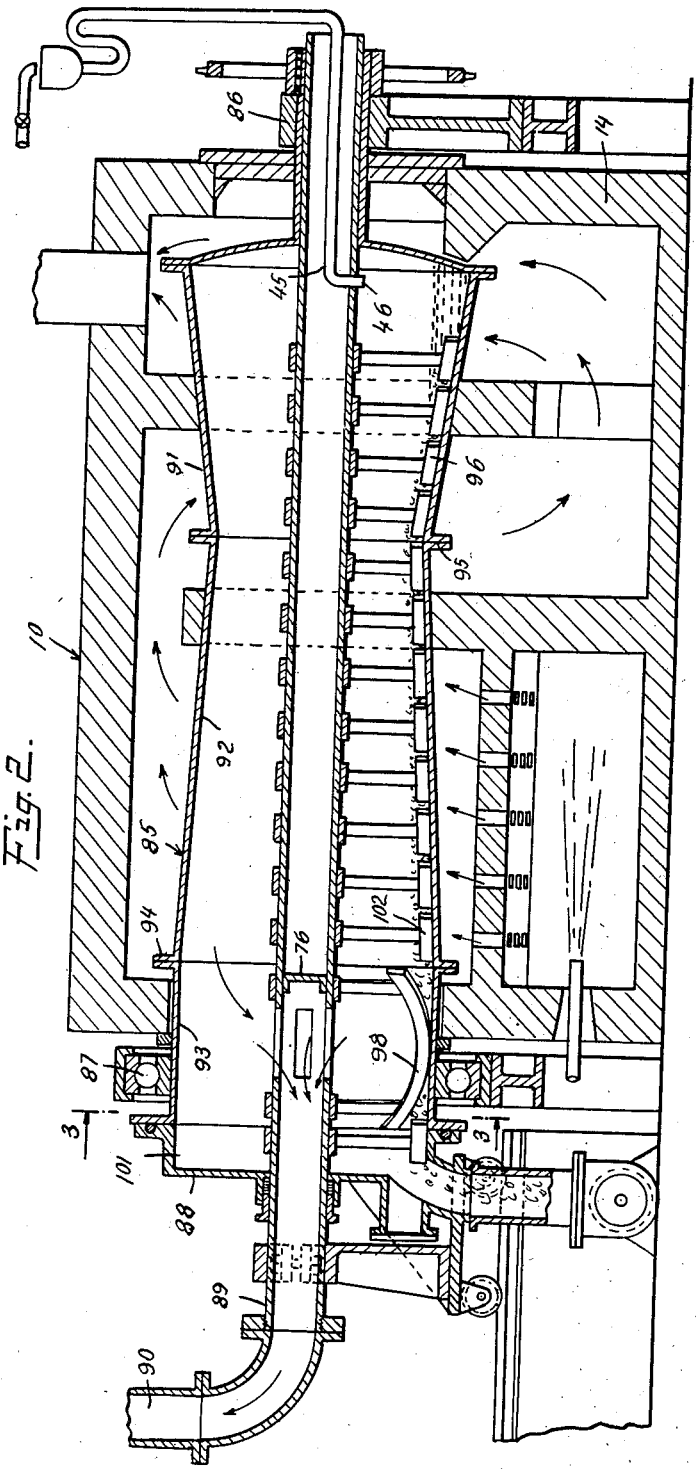
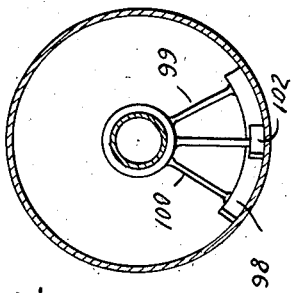
INVENTOR
H.O.C. Ingraham
BY
J. Ross Little
ATTORNEY Patented Feb. 23, 1937

2,071,534

UNITED STATES PATENT OFFICE 2,071,534

APPARATUS FOR PRODUCING SULPHUR DIOXIDE

Harold O. C. Ingraham, Greenwich, Conn., assignor to General Chemical Company, New York, N. Y., a corporation of New York Application August 18, 1932, Serial No. 629,329

6 Claims. (Cl. 23—279)

This invention relates to methods and apparatus for the production of gas mixtures rich in sulphur dioxide, and is more particularly directed to the formation of sulphur dioxide by decomposition of sulphuric acid sludges constituting waste products of processes for refining petroleum and other oil distillates.

Acid sludges contain relatively large quantities of sulphuric acid, free or combined. A sludge of this character presents problems both with respect to disposal of the sludge where no attempt is made to recover the acid content thereof, and also in connection with the provision of satisfactory processes for separating and recovering sulphur compounds from the sludge. Numerous processes have been suggested for treating acid sludges for the separation and recovery of sulphuric acid as such. Other proposals have been directed to the recovery from acid sludges of sulphur compounds as sulphur dioxide, and the subsequent utilization of the same in the production of sulphuric acid.

The present invention contemplates the recovery of sulphur compounds from acid sludges by decomposing sludge by heating with the formation of a gas mixture rich in sulphur dioxide, and the production of residual coke. Decomposition of acid sludges by heat treatments have heretofore been suggested. The processes involved, however, are endothermic and require the utilization of relatively large quantities of extraneous heat. In general, prior methods for decomposing acid sludges have been carried out in such manner as to be wasteful of heat, and further have been of such nature as not to fully permit desired control of the degree of decomposition of the sludge.

One of the principal objects of the invention lies in the provision of a process for the recovery of sulphur compounds from acid sludges carried out in such manner that decomposition of the sludge is effected by utilization of minimum amounts of extraneous heat and in which a high rate of sludge decomposition per unit area of decomposing surface is attained, whereby the cost of decomposition of the sludge, and the investment in apparatus are relatively small. A particular object of the invention resides in the provision of a process for decomposing acid sludge in a rotary kiln by which the destructive effects of the heated sludge, because of the acidity thereof, on the apparatus employed may be largely overcome. The invention also aims to provide a process by which the degree of decomposition of the sludge may be easily controlled, and by which the carbonaceous residues produced may be conveniently subjected to relatively high temperatures at the end of the process to insure the desired complete decomposition of the sludge.

Generally speaking, the invention contemplates methods for decomposing acid sludge in rotary externally heated kilns or retorts. According to a preferred embodiment of the process aspect of the present improvements, the invention comprises the introduction of acid sludge into one section of an externally heated rotary kiln, the section of the kiln being maintained at temperatures sufficient to initiate decomposition of the sludge. The kiln or decomposing chamber is so formed, and operations so conducted, that there is continuously maintained immediately adjacent the sludge inlet, a relatively coherent liquid or semi-liquid mass of substantial size of partly decomposed acid sludge. In this initial phase of the reaction, destructive distillation of the sludge gets well under way with the production of a sulphur dioxide gas mixture and residual material comprising partly decomposed sludge. As the process proceeds, relatively segregated bodies of residual sludge material are withdrawn from the mass of sludge material at the inlet end of the kiln. The sludge material comprising the relatively segregated bodies is then worked gradually through the remaining section of the kiln during which period the material is subjected to further heat treatment at preferably progressively increasing temperatures to continue decomposition of the material to form additional quantities of sulphur dioxide and ultimately convert the residual carbonaceous material to coke. Decomposition of the sludge is preferably carried out in the substantial absence of air so that burning of the carbonaceous residue is prevented, and because of the absence of diluting gases during the decomposition reaction a relatively concentrated sulphur dioxide gas mixture is readily obtained. The invention also comprises, as an important part thereof, the provision of apparatus by which the process may be economically carried out, and which apparatus is so designed that decomposition of acid sludge may be carried out in such manner as to minimize corrosive effect of the acid of the sludge.

Further appreciation of the objects and advantages of the invention may be had from a consideration of the following description taken in connection with the accompanying drawings in which Fig. 1 is a vertical, longitudinal section of one preferred embodiment of acid sludge decomposing kiln;

Fig. 2 is a longitudinal, vertical section of a modified form, and

Fig. 3 is a transverse section on the line 3—3 of Fig. 2.

Referring more particularly to Fig. 1, 10 indicates a substantially rectangular furnace setting built of refractory material and forming a heating chamber 11 in which is rotatably mounted a decomposing kiln, of cast iron or other resistant substance, designated generally by reference numeral 12. In the front and rear walls 13 and 14 of the furnace setting are openings 15 and 16 to accommodate the rotary kiln and associated feed and discharge connections. At the forward end of the furnace is a combustion chamber 18 formed partly by the lower section of fire wall 19 and the arched brickwork 20. The combustion chamber is equipped with burners 22 of any approved design adapted to utilize pulverized coal, gas, oil or other suitable fuel.

The vertical, transverse fire wall 19 has a cutout section 24 to receive the kiln 12, and as shown at 26, the fire wall extends upwardly almost to the top of the kiln so as to cause the hot gases from the combustion chamber 18 to rise substantially vertically and completely envelop the discharge end of the kiln immediately above arch 20. Disposed about mid-way between wall 19 and the rear wall 14 of the setting, is a second transverse fire wall 27, solid from the top to a point beneath the kiln, and near the base of the furnace provided with an arched opening 28 through which hot gases pass into the base of the chamber 29 within which is the larger end of the kiln. Spent combustion gases leave the apparatus through stack 30.

As will be seen from the drawings, the kiln 12 comprises a pair of frusto-conical sections 32 and 33 bolted together by flanges 34 to form a single substantially cone-shaped shell. The larger end of the kiln is closed off by a circular head 35 from which projects a cylindrical sleeve 36 extending through a closure 37 in opening 15 of the furnace wall and through a bearing 39 on the upper end of a pedestal 40. On the outer end of the sleeve 36 beyond the bearing 39 there is keyed a gear 41, connected to a suitable source of power, for rotating the retort. Extending axially through the kiln is a fixed, hollow shaft indicated generally by reference numeral 43, one end of the shaft projecting through sleeve 36 with a gas-tight fit.

Acid sludge, or other liquid material to be treated in the kiln, is introduced through a feed pipe 45 positioned within the shaft and having an outlet end 46 projecting through an opening in the underside of the shaft just within the kiln. Pipe 45 communicates with a reservoir 47 through a liquid seal 48, and liquid material is run into reservoir 47 through a valve-controlled pipe 50 connected to a supply tank.

The smaller end of the kiln passes through opening 16 in the front wall 13 of the setting and into a chamber 53 formed by an axially movable, non-rotatable casing or head 54 mounted on a carriage 55 arranged to move back and forth along rails 56. Welded or otherwise fixed to the outer surface of section 33 of the kiln is an annular ring 58. On casing 54 is a rim 59 forming with ring 58 an annular channel adapted to receive a ring-bearing 60. Escape of gases from chamber 11 between the end of the kiln and the edge of opening 16 is prevented by packing 61, and a second packing ring 62 carried in a recess in the vertical section 63 of casing 54 provides a gas-tight joint between the rotating ring 58 and the fixed casing 54. The weight of the small end of the kiln is thus carried through bearing 60 to carriage 55.

An outlet passage 65, formed by a part of casing 54, communicates at its upper end with the bottom of chamber 53 and is adapted, when carriage 55 is in the position shown in the drawings, to discharge solid material into the upper end of a stationary conduit 68 emptying into a chamber 69, from which solid material may be continuously removed to a storage bin by a conveyor not shown. The casing 54 may be provided with one or more clean-out openings 70, conveniently located. The fixed shaft 43 extends through casing 54, and carries on the end a removable flange 71 affording means for connecting the shaft to a gas discharge pipe 72. A gas-tight pipe connection between the casing 54 and the shaft is maintained by a gland and packing 73. Shaft 43 is held in fixed position by a clamp 74 on the upper end of an arm 75 mounted on carriage 55.

Within the shaft 43 near the discharge end of the kiln is a plug 76 immediately beyond which is a plurality of slots 77 in the wall of the shaft providing communication between the decomposing chamber in the kiln and the inside of that end of the shaft opening into gas outlet pipe 72. Within the kiln and rigidly attached to the shaft 43 are vertical downwardly extending arms 79 carrying rabbles 80 pitched so that, on rotation of the kiln, solid material is gradually worked upwardly through the retort toward the discharge chamber 53. Arms 79 are of such length that the clearance between the edges of the rabbles 80 and the inner surface of the drum is small, to prevent adherence of material to the inner surface of the kiln.

Casing 54, constituting the head of the outlet end of the kiln, may be held in place by any suitable means such as one or more heavy springs or weighted levers arranged to constantly force the casing into engagement with ring 58. This feature of construction provides a gas-tight connection between the kiln and the casing 54, and at the same time takes care of expansion and contraction caused by temperature changes. A further advantage of this construction is that the casing 54 may be readily moved out of engagement with the end of the kiln to permit cleaning and repair thereof. The carriage 55 and casing 54 may be moved away from the kiln any desired distance by loosening clamp 74 and removing flange 71 if necessary.

The general construction of the modified form of decomposing furnace disclosed in Fig. 2 is substantially the same as that already described in connection with Fig. 1. In Fig. 2, the kiln 85 is rotatably mounted in bearings 86 and 87, and is provided with an axially movable, non-rotatable head 88 through which passes the fixed hollow shaft 89, connected to gas discharge pipe 90.

One important element involved in the apparatus of Fig. 2 lies in the particular construction of the kiln 85 which is made up by the frusto-conical sections 91 and 92 and the short cylindrical section 93, bolted together through flanges 94 and 95. As will be seen from an inspection of the drawings, the small ends of sections 91 and 92 are joined by flange 95, the larger diameter of section 91 being adjacent the rear wall 14 of the furnace setting, and providing for the maintenance of a mass of material beneath outlet 46 of feed pipe 45. The kiln is equipped with a plurality of rabbles 96 pitched to move solid material through the kiln and into the cylindrical section 93. The discharge of the solid material from the latter is facilitated by the conveyor ribbon 98 held in fixed position by arms 99 and 100, final discharge of material from chamber 101 in head 88 being effected by rabble 102. If it is desired to discharge coke at a level higher than the lower edge of the drum, the interior of the outlet end of the latter may be provided with a plurality of buckets arranged to lift and discharge coke into a chute provided with a suitable air lock.

As noted, the invention principally relates to methods and apparatus for decomposing acid sludges formed in the refining of oils by sulphuric acid treatments. Destructive distillation of acid sludges with the formation of sulphur dioxide gas and production of coke may be carried out in conjunction with apparatus described substantially as follows:

Referring to Fig. 1, in starting operation, the burners 22 in the combustion chamber 18 are regulated so as to create in the smaller end of the kiln 12 immediately above the arch 20 temperatures within the range of about 600–700° F. Because of the particular arrangement of the transverse fire walls in chamber 11, the hot gases are caused to pass over wall 19, under wall 27, thence upwardly through chamber 29 to the furnace stack 30. Under these conditions, the temperatures prevailing in the larger section 32 of the kiln adjacent the sludge inlet 46 are approximately 400°–500° F. Desirably, burners 22 should be so adjusted as to insure at the inlet end of the kiln temperatures not less than 400° F. and preferably between 450° and 500° F.

Acid sludge, containing for example 45% free or combined sulphuric acid, 20% oils and tarry hydrocarbons and 35% water is fed into the receptacle 47 through pipe 50, and runs through the liquid seal 48 and pipe 45 into the enlarged end of the kiln. With temperatures in this section of the kiln as above noted, decomposition of sludge is immediately initiated with the production of sulphur dioxide gas and partly decomposed sludge material. Because of the particular conformation of the decomposing kiln, after operation is under way, there is thereafter continuously maintained in the enlarged end of the kiln immediately beneath outlet 46 a relatively coherent mass of partly decomposed sludge material. Sludge thereafter introduced falls directly upon this body of material, and immediate contact between the metallic walls of the kiln and the acid of the acid sludge is prevented thereby overcoming, to a large extent, undue corrosion of this section of the kiln, which section may be readily replaced, if necessary, by disconnecting flanges 34.

The decomposition reaction taking place in all parts of the kiln involves principally the reduction of sulphuric acid by the hydrogen of hydrocarbons and/or by the carbonaceous matter contained in the sludge with the production of sulphur dioxide and coke. Gases generated by the reaction contain relatively large amounts of hydrocarbons, carbon dioxide, carbon monoxide, nitrogen, etc. Gases of this nature pass through the kiln toward the smaller end, and enter the hollow shaft 43 through slots 77.

The kiln 12 is rotated at a suitable rate through gear 41. It will be noted that rabble 80'' acts as a stirrer or agitator mixing the fresh acid sludge with the partially decomposed sludge. This rabble further prevents the building up of a thick deposit of coke in the interior of the shell in this zone. As the kiln rotates, because of the fixed relation of rabbles 80, 80' and 80'', relatively segregated bodies of partly decomposed sludge material are withdrawn from the mass of material at the inlet end of the kiln, and are worked gradually upwardly through the kiln toward the chamber 53 surrounding the discharge end of the kiln. During this movement of sludge material through the remaining section of the kiln, decomposition of acid sludge continues, and the carbonaceous material contained in the sludge is finally reduced to coke. During this final stage of the process, temperatures prevailing within the retort progressively increase, until, in that section of the kiln immediately above arch 20 and adjacent the discharge end, the coke or partly formed coke, is subjected to temperatures in the neighborhood of 600–700° F. This procedure by which the temperatures are gradually increased, the hot gases in chamber 11 flowing countercurrent to the movement of sludge material through the kiln, serves to facilitate complete decomposition of the sludge, and produce a coke material containing, if desired, little or no undecomposed sulphuric acid. The coke finally ejected from the kiln into chamber 53, and discharged from the apparatus through conduits 65 and 68 may be of approximately the following composition:

| | |
|---|---|
| Total acidity_____$H_2SO_4$__ | 2.1% |
| Ash_____ | 1.2% |
| Total volatile matter including $H_2SO_4$____ | 32.1% |
| Fixed carbon_____ | 67.7% |

The gaseous products of the decomposition of the sludge in the kiln are discharged from the apparatus through outlet pipe 72, and may be passed through a cooler to lower the temperature of the gases to about normal to separate condensable vapors from the gas stream. Since decomposition is carried out in the kiln substantially in the absence of air, burning of carbonaceous material therein is prevented and the gases discharged from the reaction chamber are relatively rich in sulphur dioxide which may amount to about 15% by volume. On cooling of the gas stream and separation therefrom of the greater part of the water vapor and condensable hydrocarbons, the gas mixture, which may contain as high as 75–99% sulphur dioxide, the balance comprising principally carbon dioxide and water, may be utilized directly where a concentrated sulphur dioxide gas is desired, or the gases may be further purified, diluted with air, and utilized in the manufacture of sulphuric acid.

The invention also affords a method by which destructive distillation of acid sludge to any degree may be had. For example, where it is desired to carry the decomposition reaction only to that point at which substantially all of the acid contained in the acid sludge is decomposed, thereby producing a coke containing but little sulphuric acid, such result may be obtained by regulating the quantity of acid sludge fed through inlet pipe 45 and the rate of rotation of the kiln. On the other hand, it might be desired to decompose the sludge in such manner that the coke contains appreciable amounts of undecomposed sulphuric acid, and in other situations, it might be desired to carry decomposition beyond the reduction of all sulphuric acid contained and to such degree as to remove substantial amounts of volatile matter. The required results may be obtained by regulation of the sludge feed and rate of rotation of the kiln.

The operation of the method when carried out in apparatus disclosed in Fig. 2 is, in most respects, substantially the same as described in connection with the apparatus shown in Fig. 1. In some instances, the apparatus of Fig. 2 may be preferred since, as will be appreciated from a consideration of the drawings, the gradually enlarging cross-section of section 92 of the kiln affords for the coke or partially coked material being moved toward the discharge end an increasingly larger area of heat transfer surface, and hence decomposition of the solid lumps or particles is furthered by this distribution of coke over a larger surface.

I claim:

1. Apparatus for treating materials comprising in combination, a combustion chamber, a rotary kiln therein, said kiln including a pair of frusto-conically shaped sections joined axially at their smaller ends, means for rotating the kiln, means for introducing materials to be treated, and means for discharging reaction products therefrom.

2. Apparatus of the character described comprising a furnace setting forming a combustion chamber, a cone-shaped, horizontally disposed kiln rotatably mounted in the combustion chamber and having the smaller end projecting through the setting, means for rotating the kiln, a hollow fixed shaft passing axially through the kiln, an inlet pipe associated with the shaft and arranged to introduce material to be treated into the larger end of the kiln, rabbles fixed to the shaft for moving material through the kiln, a non-rotatable head for the smaller end of the kiln, means for withdrawing reaction products through said head, and means for causing hot gases to pass through the combustion chamber in contact with the outer surface of the kiln countercurrent to the flow of material through the kiln.

3. Apparatus of the character described comprising a furnace setting forming a combustion chamber, a relatively horizontally disposed kiln rotatably mounted in the combustion chamber, means for rotating the kiln, an inlet at one end of the kiln for introducing material to be treated, the end of the kiln adjacent the inlet being conical in form with the larger diameter adjacent the inlet, the kiln being so mounted in the furnace setting that the outlet end of the kiln projects through the furnace setting, a fixed shaft passing axially through the kiln, rabbles fixed to the shaft and pitched to move material through the kiln toward the outlet end, a head for the outlet end of the kiln, and means for withdrawing reaction products through said head.

4. Apparatus of the character described comprising a furnace setting forming a combustion chamber, a relatively horizontally disposed kiln rotatably mounted in the combustion chamber, means for rotating the kiln, an inlet at one end of the kiln for introducing material to be treated, the end of the kiln adjacent the inlet being conical in form with the larger diameter adjacent the inlet, the kiln being so mounted in the furnace setting that the outlet end of the kiln projects through the furnace setting, a fixed shaft passing axially through the kiln, rabbles connected to the shaft for moving material through the kiln toward the outlet end, a head for the outlet end of the kiln, means for withdrawing reaction products through said head, and means for causing hot gases to pass through the combustion chamber in contact with the outer surface of the kiln countercurrent to the flow of material through the kiln.

5. Apparatus of the character described comprising a furnace setting forming a combustion chamber, a cone-shaped, horizontally disposed kiln rotatably mounted in the combustion chamber and having the smaller end projecting through the setting, means for rotating the kiln, a fixed shaft passing axially through the kiln, an inlet pipe arranged to introduce material to be treated into the larger end of the kiln, rabbles fixed to the shaft for moving material through the kiln, a head for the smaller end of the kiln, means for withdrawing reaction products through said head, and means for causing hot gases to pass through the combustion chamber in contact with the outer surface of the kiln countercurrent to the flow of material through the kiln.

6. Apparatus of the character described comprising a furnace setting forming a combustion chamber, a relatively horizontally disposed kiln rotatably mounted in the combustion chamber, said kiln including a pair of frusto-conically shaped sections joined axially at their smaller ends, means for rotating the kiln, an inlet at one end of the kiln for introducing material to be treated, the kiln being so mounted in the furnace that the outlet end of the kiln projects through the furnace setting, a fixed shaft passing axially through the kiln, rabbles connected to the shaft for moving material through the kiln toward the outlet end, a head for the outlet end of the kiln and means for withdrawing reaction products through said head.

HAROLD O. C. INGRAHAM.